(12) United States Patent
Aso et al.

(10) Patent No.: US 8,000,884 B2
(45) Date of Patent: Aug. 16, 2011

(54) DEVICE AND METHOD FOR CONTROLLING IGNITION TIMING OF INTERNAL COMBUSTION ENGINE

(75) Inventors: Koji Aso, Susono (JP); Kenji Kasashima, Nishikamo-gun (JP); Rihito Kaneko, Nishikamo-gun (JP); Masatomo Yoshihara, Toyota (JP); Kenji Senda, Okazaki (JP); Yuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 73 days.

(21) Appl. No.: 12/096,390

(22) PCT Filed: Dec. 8, 2006

(86) PCT No.: PCT/JP2006/325007
§ 371 (c)(1),
(2), (4) Date: Jun. 6, 2008

(87) PCT Pub. No.: WO2007/066830
PCT Pub. Date: Jun. 14, 2007

(65) Prior Publication Data
US 2009/0165746 A1    Jul. 2, 2009

(30) Foreign Application Priority Data

Dec. 9, 2005   (JP) .................................. 2005-356496

(51) Int. Cl.
*G06F 19/00* (2006.01)
*F02P 5/00* (2006.01)
*G06G 7/70* (2006.01)

(52) U.S. Cl. .............. 701/111; 123/406.29; 123/406.34; 123/406.38

(58) Field of Classification Search ............. 123/406.38, 123/198 D, 406.29, 406.34; 73/40, 40.7, 73/49.1, 49.2, 49.3, 49.7, 35.03, 35.04; 702/189, 702/190; 701/111
See application file for complete search history.

(56) References Cited

U.S. PATENT DOCUMENTS

| 4,539,957 A | * | 9/1985 | Haraguchi et al. ........ 123/406.38 |
| 4,825,832 A | * | 5/1989 | Satoh et al. .............. 123/406.21 |
| 5,134,980 A | * | 8/1992 | Sakakibara et al. ..... 123/406.38 |

(Continued)

FOREIGN PATENT DOCUMENTS

JP          1 196522          8/1989

(Continued)

*Primary Examiner* — Erick Solis
*Assistant Examiner* — Sizo B Vilakazi
(74) *Attorney, Agent, or Firm* — Oblon, Spivak, McClelland, Maier & Neustadt, L.L.P.

(57) ABSTRACT

A device and associated method for controlling ignition timing of an internal combustion engine are provided. By comparing a determination value and knock magnitude, determination of knocking is made, and ignition timing is advanced or retarded. The device includes an operation unit that sets a correction amount of the determination value to a value corresponding to a degree of change of the determination value over time. The operation unit calculates, at a first timing, a first value related to an average value of the determination values; and calculates, at a second timing later than the first timing, a second value related to the average value of the determination values. The degree of change of the determination value is calculated as a difference between the first value and the second value.

21 Claims, 16 Drawing Sheets

U.S. PATENT DOCUMENTS

| | | | | |
|---|---|---|---|---|
| 5,186,145 A | * | 2/1993 | Sakakibara | 123/406.16 |
| 5,287,282 A | * | 2/1994 | Imai | 701/111 |
| 5,355,853 A | * | 10/1994 | Yamada et al. | 123/406.38 |
| 5,862,505 A | * | 1/1999 | Fujiki | 701/111 |
| 6,230,546 B1 | * | 5/2001 | Wilstermann et al. | 73/35.08 |
| 6,360,586 B1 | * | 3/2002 | Morishita et al. | 73/35.08 |
| 6,561,163 B1 | * | 5/2003 | Takahashi et al. | 123/406.21 |
| 7,281,516 B2 | * | 10/2007 | Kaneko et al. | 123/406.38 |
| 7,392,788 B2 | * | 7/2008 | Kaneko et al. | 123/406.29 |
| 7,588,015 B2 | * | 9/2009 | Kaneko et al. | 123/406.21 |
| 2003/0005749 A1 | * | 1/2003 | Nishimura | 73/35.01 |
| 2006/0288981 A1 | * | 12/2006 | Kaneko et al. | 123/406.37 |
| 2007/0084266 A1 | * | 4/2007 | Kaneko et al. | 73/35.03 |
| 2007/0175444 A1 | * | 8/2007 | Kaneko et al. | 123/406.16 |
| 2007/0215109 A1 | * | 9/2007 | Kaneko et al. | 123/406.34 |
| 2009/0165746 A1 | * | 7/2009 | Aso et al. | 123/406.38 |

FOREIGN PATENT DOCUMENTS

| | | | |
|---|---|---|---|
| JP | 8 19890 | | 3/1992 |
| JP | 4 103877 | | 4/1992 |
| JP | 8 151951 | | 6/1996 |
| JP | 08151951 A | * | 6/1996 |
| JP | 2003 21032 | | 1/2003 |
| JP | 2004 353531 | | 12/2004 |
| JP | 2005 23902 | | 1/2005 |

* cited by examiner

FIG. 7

ENGINE SPEED NE

| A | C | B |
|---|---|---|
| B | C | B |
| A | B | A |

INTAKE AIR AMOUNT KL

F I G. 1 2
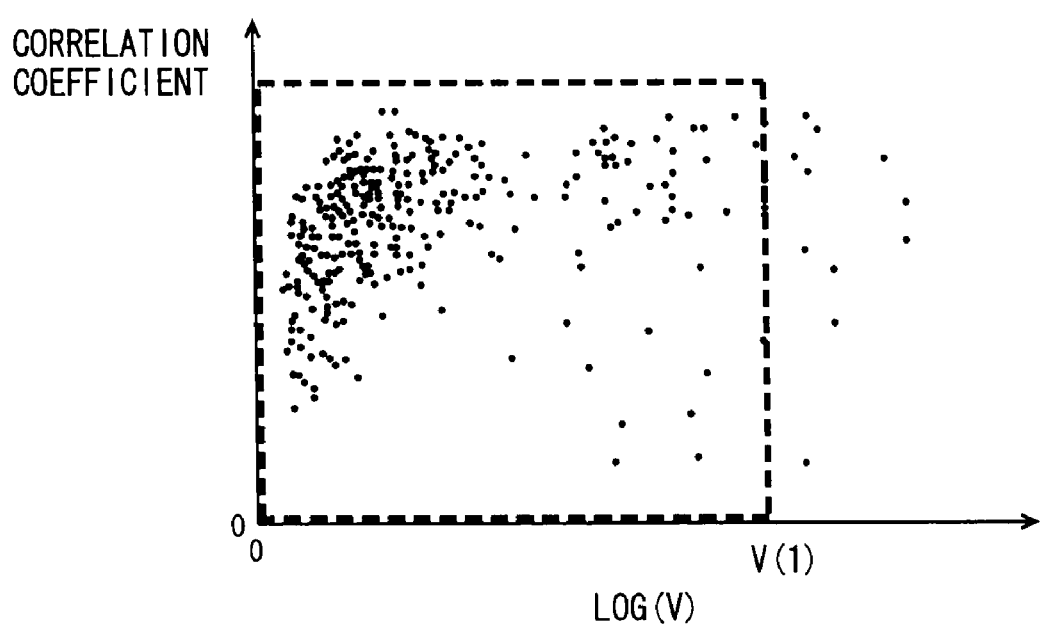

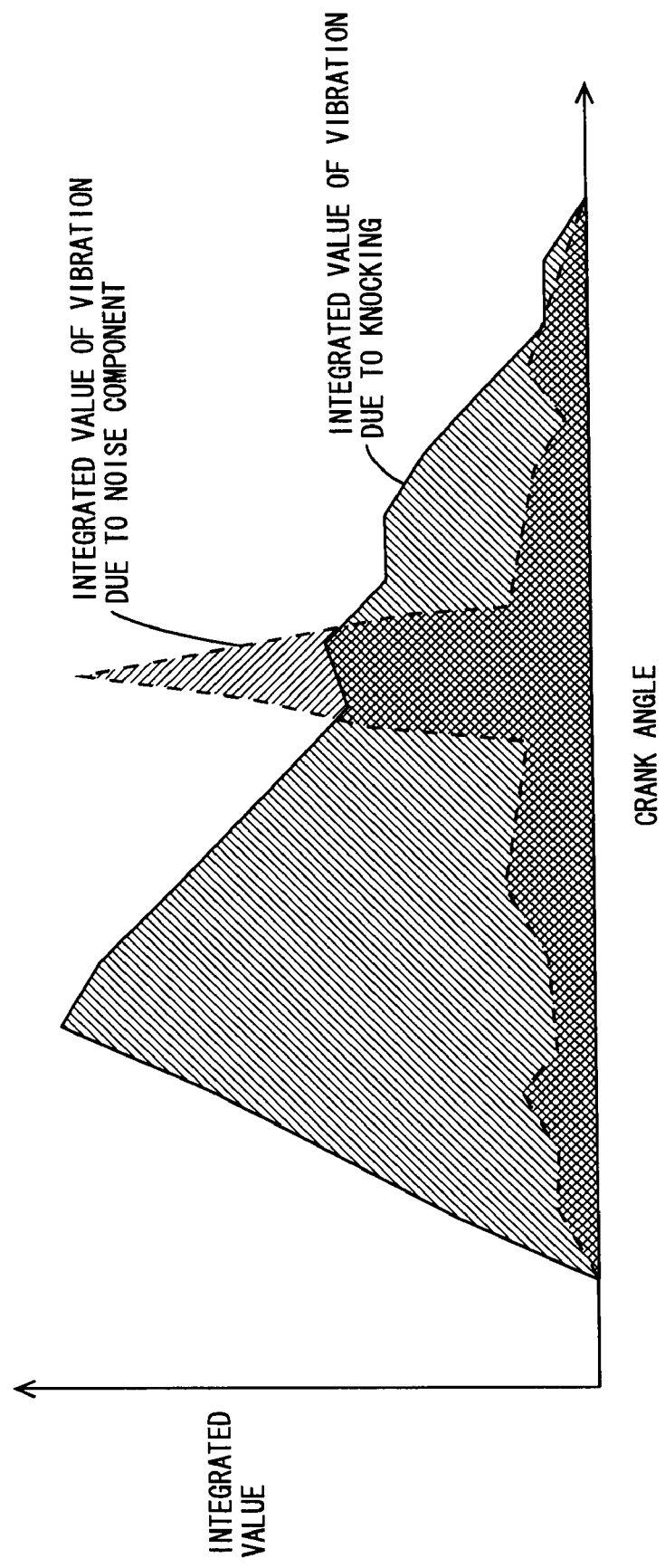

DEVICE AND METHOD FOR CONTROLLING IGNITION TIMING OF INTERNAL COMBUSTION ENGINE

TECHNICAL FIELD

The present invention relates to device and method for controlling ignition timing of an internal combustion engine, and particularly to a technique of controlling ignition timing based on whether knocking is present or absent.

BACKGROUND ART

Conventionally, various methods of determining whether knocking (knock) is present or absent have been proposed. For example, there is a technique of determining occurrence of knocking based on whether or not magnitude of vibration detected in an internal combustion engine is greater than a knocking determination value. A knock control device for an internal combustion engine disclosed in Japanese Patent Laying-Open No. 2003-21032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor, and a final determination portion finally determining occurrence of knocking based on the knock temporal determination of the first temporal determination portion and the knock temporal determination of the second temporal determination portion. When both of the first and second temporal determination portions determine that knocking has occurred, the final determination portion finally determines that knocking has occurred. In the first temporal determination portion, a maximum value of output signals detected by the knock sensor and a knock determination level (knock determination value) calculated based on the processing result by the statistical processing portion are compared with each other, whereby whether knocking has occurred or not is determined. Based on the occurrence frequency of knocking, the knock determination value is corrected to be a value obtained by subtracting a setting value $\Delta V$ from the knock determination value, or to a value obtained by adding a product of a value A, which is greater than "1", and setting value $\Delta V$ to the knock determination value.

According to the knock control device disclosed by the publication, a knock temporal determination by the statistical processing program and a knock temporal determination by the waveform shape program are used, and only when both of the temporal determinations determine that knocking has occurred, it is finally determined that knocking has occurred. As a result, occurrence of knocking can precisely be determined even as to an output signal with which knocking has been erroneously detected by a knock determination employing solely the statistical processing program or the waveform shape program.

However, in the knock control device of Japanese Patent Laying-Open No. 2003-21032, when the knock determination value is corrected based on the occurrence frequency of knocking, setting value $\Delta V$ being the correction amount of the knock determination value or the product of "A" and setting value $\Delta V$ is constant. Therefore, when the correction amount of the knock determination value is small, it is necessary to correct the determination value for several times and it takes time until a knock determination value with which occurrence of knocking is precisely determined and the ignition timing is precisely controlled. Thus, there has been a problem that ignition timing may not be retarded appropriately when knocking has occurred, or ignition timing may not be advanced appropriately when knocking has not occurred.

DISCLOSURE OF THE INVENTION

An object of the present invention is to provide device and method for controlling ignition timing of an internal combustion engine which are capable of appropriately controlling ignition timing.

A device for controlling ignition timing of an internal combustion engine according to an aspect of the present invention includes an operation unit. The operation unit calculates knock magnitude related to magnitude of vibration due to knocking, based on magnitude of vibration occurring in the internal combustion engine. The operation unit controls ignition timing of the internal combustion engine, based on a result of comparison between the knock magnitude and a predetermined determination value. The operation unit corrects the determination value, based on an occurrence frequency of the knocking. The operation unit sets a correction amount of the determination value to a value corresponding to greatness of the determination value.

According to the present invention, knock magnitude related to magnitude of vibration due to knocking is calculated based on magnitude of vibration occurring in the internal combustion engine. Ignition timing of the internal combustion engine is controlled based on a result of comparison between the knock magnitude and a predetermined determination value. For example, when knock magnitude is greater than a predetermined determination value, it is determined that knocking has occurred, and ignition timing is retarded. When the knock magnitude is smaller than the predetermined determination value, it is determined that knocking has not occurred, and ignition timing is advanced. Meanwhile, a magnitude of the same vibration occurring in the internal combustion engine may be detected by a knock sensor as different values due to variation in the output values and degradation of the knock sensor, and the calculated knock magnitude may vary. In this case ignition timing having been appropriately controlled at the initial state of the internal combustion engine may be inappropriate. As such, for example when it can be regarded to be a state where occurrence frequency of knocking is high, it is necessary to correct the determination value according to the state of vibration occurring in the internal combustion engine so that retard control of ignition timing is frequently performed. Accordingly, the determination value is corrected based on the occurrence frequency of knocking. For example, when the occurrence frequency of knocking is higher than a predetermined frequency, the determination value is corrected to be small. As a result, retard control of ignition timing can be performed more frequently. Conversely, when the occurrence frequency of knocking is lower than the predetermined frequency, the determination value is corrected to be great. As a result, advance control of ignition timing can be performed more frequently. Thus, the determination value can be corrected based on the occurrence frequency of knocking, and ignition timing can appropriately be controlled. There may be a case where an initial value of the determination value, e.g., in starting of the internal combustion engine, greatly differs from the above-described determination value with which the ignition timing can appropriately be controlled. In such a case, if the correction amount of the determination value is small and constant, it takes time to correct the determination value so as to be a value with which igniting timing can appropriately be controlled. Therefore, the correction amount of the determination value is set to a value corresponding to greatness of the determination value. For example, when the difference between the current determination value and the determination value with which ignition timing can appropriately be controlled is great, the correction amount of the determination value is set to be great. As a result, the determination value can be brought into a state, at an earlier stage, where ignition timing can appropriately be controlled. When the difference between the current determination value and the determination value with which ignition timing can appropriately be controlled is small, the correction amount of the determination value is set to be small. Thus, the state where ignition timing can appropriately be controlled can be maintained. As a result, a device for controlling ignition timing of an internal combustion engine capable of appropriately controlling ignition timing can be provided.

Preferably, the operation unit sets the correction amount of the determination value to the value corresponding to the greatness of the determination value, by setting a correction amount corresponding to a degree of change of the determination value as a result of the determination value being corrected for a plurality of times.

According to the present invention, a correction amount is set corresponding to a degree of change of the determination value as a result of the determination value being corrected for a plurality of times. Since the determination value is corrected based on the occurrence frequency of knocking, when the degree of change of the determination value as a result of the determination value being corrected for a plurality of times is great, it can be regarded to be a state where the occurrence frequency of knocking is excessively high or low. This can be regarded that the difference between the current determination value and the determination value with which ignition timing can appropriately be controlled is great. Therefore, for example, the correction amount of the determination value is set to be great. As a result, the determination value can be brought into a state, at an earlier stage, where ignition timing can appropriately be controlled. Conversely, when the degree of change of the determination value as a result of the determination value being corrected for a plurality of times is small, it can be regarded to be a state where the occurrence frequency of knocking is not excessively high or low. This can be regarded that the difference between the current determination value and the determination value with which ignition timing can appropriately be controlled is small. Therefore, for example, the correction amount of the determination value is set to be small. Thus, the state where ignition timing can appropriately be controlled can be maintained.

Further preferably, when the degree of change of the determination value is great, the operation unit sets the correction amount to be greater than when the degree of change of the determination value is small.

According to the present invention, when the degree of change of the determination value is great, the correction amount is set to be greater than when the degree of change of the determination value is small. Since the determination value is corrected based on the occurrence frequency of knocking, when the degree of change of the determination value as a result of the determination value being corrected for a plurality of times is great, it can be regarded to be a state where the occurrence frequency of knocking is excessively high or low. This can be regarded that the difference between the current determination value and the determination value with which ignition timing can appropriately be controlled is great. Therefore, the correction amount of the determination value is set to be great. As a result, the determination value can be brought into a state, at an earlier stage, where ignition timing can appropriately be controlled. Conversely, when the degree of change of the determination value as a result of the determination value being corrected for a plurality of times is small, it can be regarded to be a state where the occurrence frequency of knocking is not excessively high or low. This can be regarded that the difference between the current determination value and the determination value with which ignition timing can appropriately be controlled is small. Therefore, the correction amount of the determination value is set to be small. Thus, the state where ignition timing can appropriately be controlled can be maintained.

Still further preferably, when the degree of change of the determination value is greater than a predetermined degree, the operation unit sets the correction amount to be greater than when the degree of change of the determination value is smaller than the predetermined degree.

According to the present invention, when the degree of change of the determination value is greater than a predetermined degree, the correction amount is set to be greater than when the degree of change of the determination value is smaller. Since the determination value is corrected based on the occurrence frequency of knocking, when the degree of change of the determination value as a result of the determination value being corrected for a plurality of times is greater than a predetermined degree, it can be regarded to be a state where the occurrence frequency of knocking is excessively high or low. This can be regarded that the difference between the current determination value and the determination value with which ignition timing can appropriately be controlled is great. Accordingly, when the degree of change of the determination value is greater than a predetermined degree, the correction amount of the determination value is set to be great. As a result, the determination value can be brought into a state, at an earlier stage, where ignition timing can appropriately be controlled.

Still further preferably, when the degree of change of the determination value is smaller than a predetermined degree, the operation unit sets the correction amount to be smaller than when the degree of change of the determination value is greater than the predetermined degree.

According to the present invention, when the degree of change of the determination value is smaller than a predetermined degree, the correction amount is set to be smaller than when the degree of change of the determination value is greater. Since the determination value is corrected based on the occurrence frequency of knocking, when the degree of change of the determination value as a result of the determination value being corrected for a plurality of times is smaller than a predetermined degree, it can be regarded to be a state where the occurrence frequency of knocking is not excessively high or low. This can be regarded that the difference between the current determination value and the determination value with which ignition timing can appropriately be controlled is small. Accordingly, when the degree of change of the determination value is smaller than a predetermined degree, the correction amount of the determination value is set to be small. As a result, the state where ignition timing can appropriately be controlled can be maintained.

Still further preferably, the operation unit determines whether or not the degree of change of the determination value is smaller than a predetermined degree, and when a number of times where the degree of change of the determination value is determined to be smaller than the predetermined degree is smaller than a predetermined number of times, the operation unit sets the correction amount to be greater than when the number of times is greater than the predetermined number of times.

According to the present invention, when a number of times where the degree of change of the determination value is determined to be smaller than the predetermined degree is smaller than a predetermined number of times, the correction amount is set to be greater than when the number of times is greater. Even in a state where the difference between the current determination value and the determination value with which ignition timing can appropriately be controlled is great and the occurrence frequency of knocking is excessively high or low, there may be a case where the degree of change of the determination value as a result of being corrected for a plurality of times is accidentally smaller than a predetermined degree of change. In such a case, if the correction amount of the determination value is set to be small, it takes time for the current determination value to become the determination value with which ignition timing can appropriately be controlled. On the other hand, when a number of times where the degree of change of the determination value is determined to be smaller than the predetermined degree is greater than a predetermined number of times, it is considered that the difference between the current determination value and the determination value with which ignition timing can appropriately be controlled is small. Therefore, when a number of times where the degree of change of the determination value is determined to be smaller than the predetermined degree is smaller than a predetermined number of times, the correction amount is set to be greater than when the number of times is greater. Thus, in a case where the difference between the current determination value and the determination value with which ignition timing can appropriately be controlled may possibly be great, the correction amount is set to be great. As a result, the determination value can be brought into a state, at an earlier stage, where ignition timing can appropriately be controlled.

Still further preferably, when the number of times where the degree of change of the determination value is determined to be smaller than the predetermined degree is greater than the predetermined number of times, the operation unit sets the correction amount to be smaller than when the number of times is smaller than the predetermined number of times.

According to the present invention, when the number of times where the degree of change of the determination value is determined to be smaller than the predetermined degree is greater than the predetermined number of times, the correction amount is set to be smaller than when the number of times is smaller. When the number of times where the degree of change of the determination value is determined to be smaller than the predetermined degree is greater than the predetermined number of times, it is considered that the difference between the current determination value and the determination value with which ignition timing can appropriately be controlled is small. Therefore, when the number of times where the degree of change of the determination value is determined to be smaller than the predetermined degree is greater than the predetermined number of times, the correction amount is set to be smaller than when the number of times is smaller. As a result, the current determination value is more precisely rendered to be the determination value with which ignition timing can appropriately be controlled. Thus, the state where ignition timing can appropriately be controlled can be maintained.

Still further preferably, the operation unit calculates, at a first timing, a first value related to an average value of the determination values. The operation unit calculates, at a second timing later than the first timing, a second value related to the average value of the determination values. The degree of change of the determination value is calculated as a difference between the first value and the second value.

According to the present invention, at a first timing, a first value related to an average value of the determination values is calculated. At a second timing later than the first timing, a second value related to the average value of the determination values is calculated. The first and second values are the values each related to an average of a plurality of determination values corrected to be great or small. The difference between the average of a plurality of determination values at the first timing and the average of a plurality of determination values at the second timing is greater when the degree of change of determination value as a result of being corrected for a plurality of times is greater, than when the degree of change of determination values is small. That is, the difference between the average of a plurality of determination values at the first timing and the average of a plurality of determination values at the second timing can be regarded as the values expressing the degree of change of the determination value as a result of being corrected for a plurality of times. Accordingly, the degree of change of the determination value as a result of being corrected for a plurality of times is calculated as the difference between the first value and the second value. As a result, the degree of change of the determination value as a result of being corrected for a plurality of times can be quantified as the difference between the first value and the second value, that is, the difference between the values each related to an average value of the determination values.

Still further preferably, when the occurrence frequency of the knocking is low, the operation unit corrects the determination value to be greater than when the occurrence frequency of the knocking is high.

According to the present invention, when control is exerted such that ignition timing is advanced when the occurrence frequency of the knocking is low, for example, when knock magnitude is smaller than the determination value, the determination value is corrected to be great so that ignition timing is more frequently advanced, thereby increasing the output of the internal combustion engine. Conversely, when control is exerted such that ignition timing is retarded when the occurrence frequency of the knocking is high, for example, when knock magnitude is greater than the determination value, the determination value is corrected to be small so that ignition timing is more frequently retarded, thereby suppressing occurrence of knocking. As a result, igniting timing can appropriately be controlled.

BRIEF DESCRIPTION OF THE DRAWINGS

FIG. 7 is a chart showing a map of a determination value V(KX) stored in the memory of the engine ECU;

FIG. 12 is a chart showing magnitude values LOG(V) used for forming the frequency distribution of the magnitude values LOG(V);

FIG. 19 is a chart (No. 2) showing an integrated value at the time of knocking and an integrated value by noise.

BEST MODES FOR CARRYING OUT THE INVENTION

Figure 1:
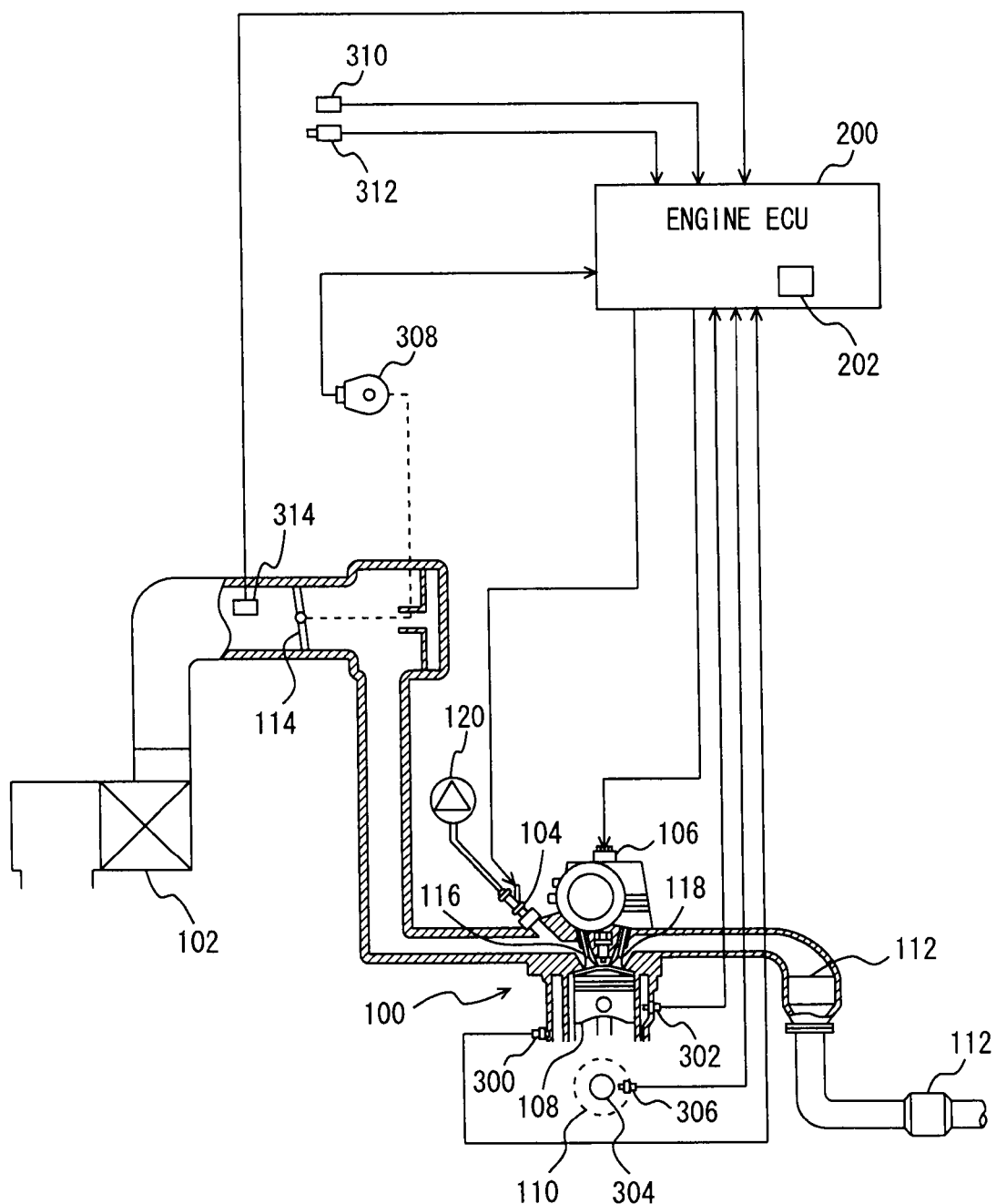
FIG. 1 is a schematic configuration diagram of an engine controlled by an engine ECU which is an ignition timing control device according to an embodiment of the present invention.

An embodiment of the present invention will be described below with reference to the drawings. In the following description, the same parts are provided with the same reference characters. They have the same names and functions. Therefore, detailed description of the same parts is not repeated.

With reference to FIG. 1, an engine 100 of a vehicle mounted with an ignition timing control device according to the embodiment of the present invention will be described. The ignition timing control device according to the present embodiment is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 performs computation based on signals sent from the respective sensors and ignition switch 312 and map and program stored in memory 202 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
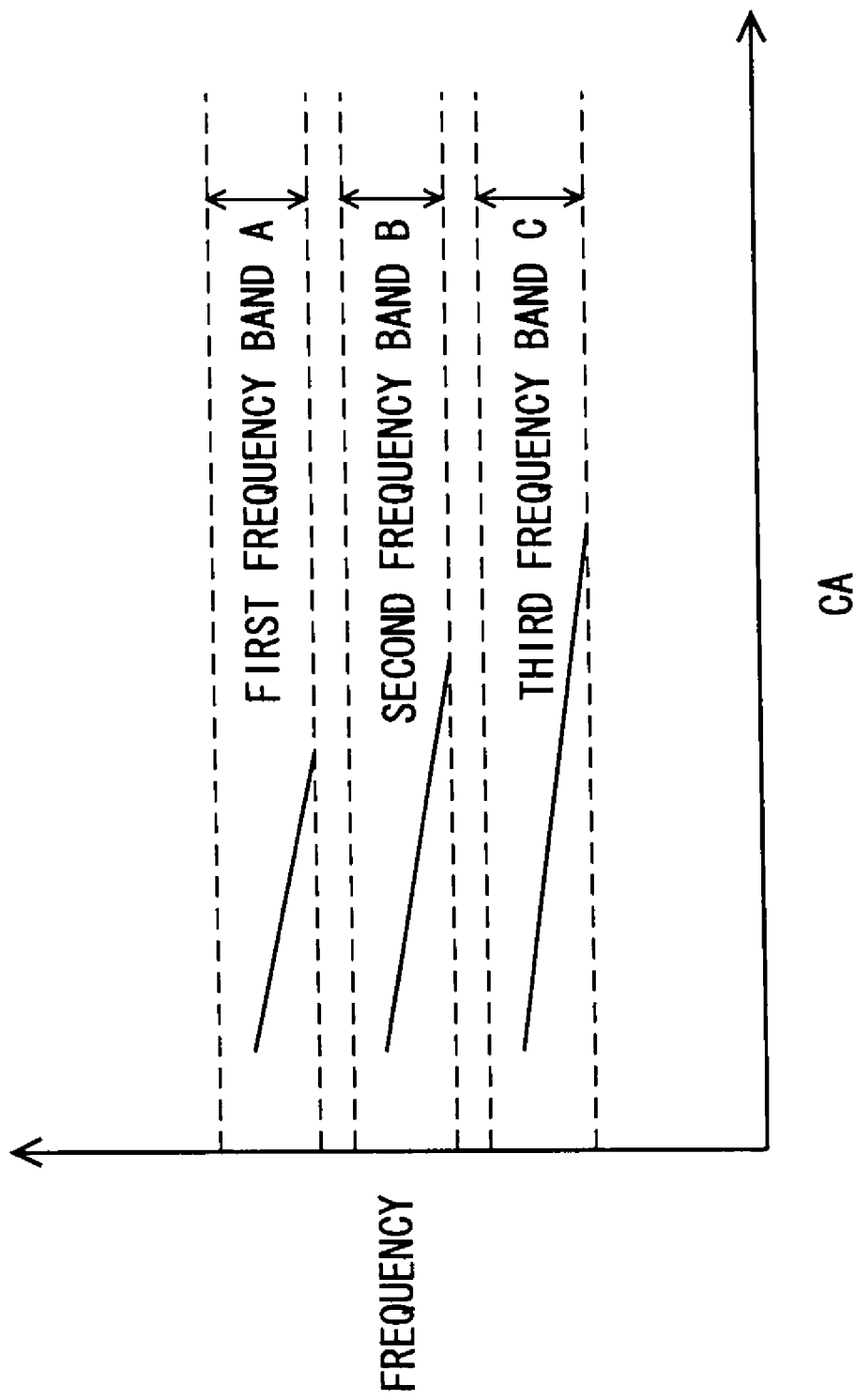
FIG. 2 is a chart showing frequency bands of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
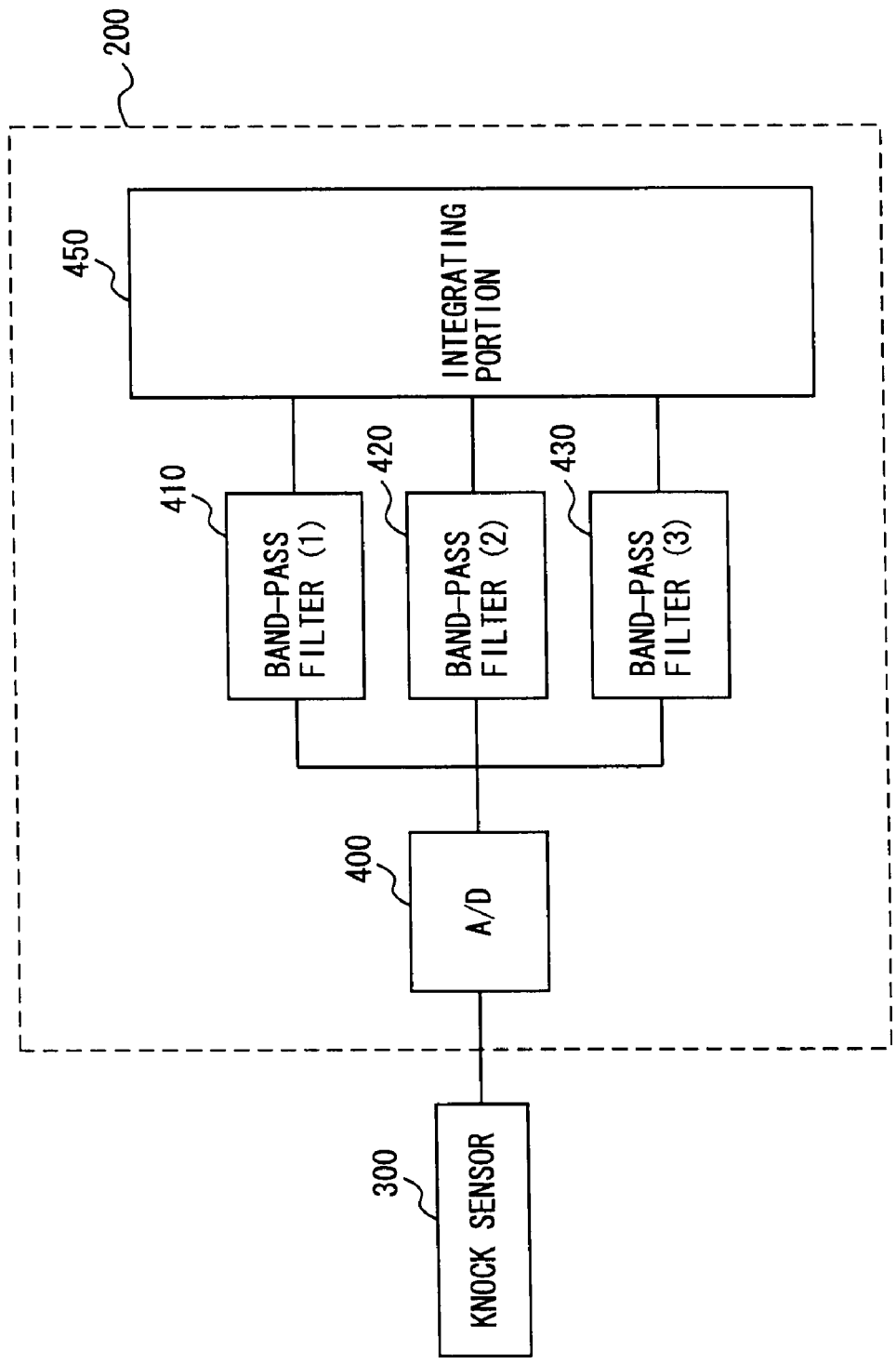
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
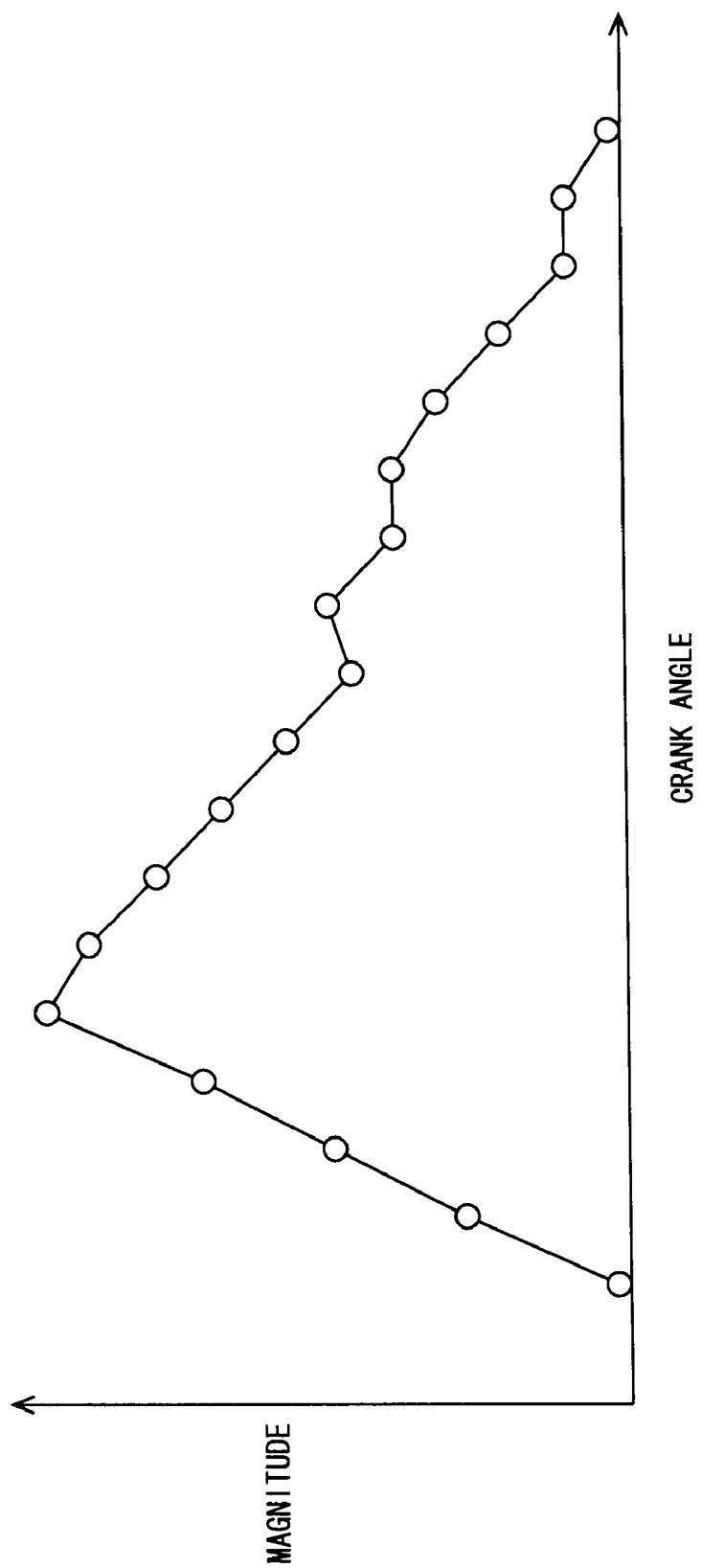
FIG. 4 is a chart showing a waveform of vibration in the engine.

As a result, as shown in FIG. 4, a vibration waveform of engine 100 is detected. In other words, the synthesized waveform of the first to third frequency bands A to C are used as the vibration waveform of engine 100.

Figure 5:
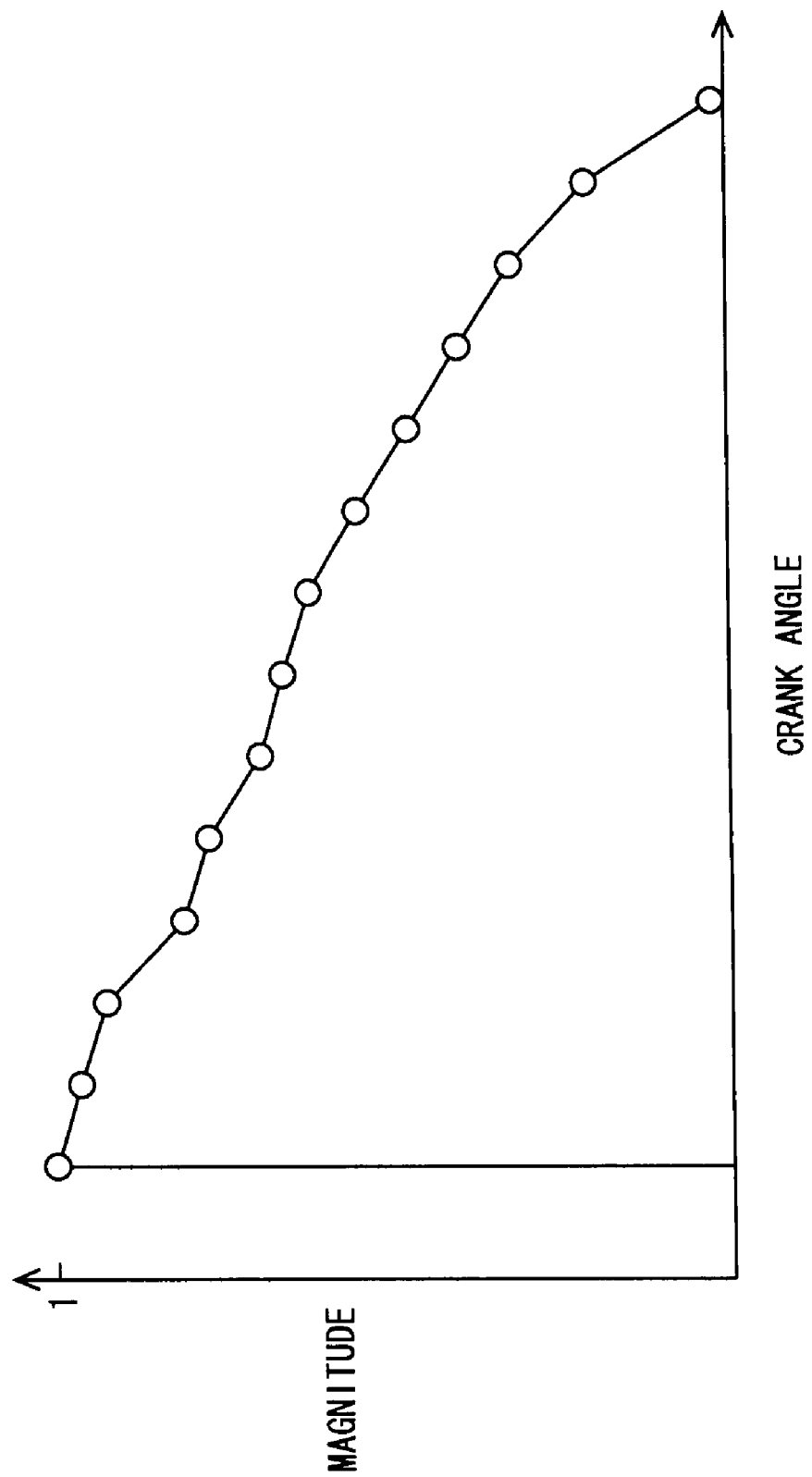
FIG. 5 is a chart showing a knock waveform model stored in memory of the engine ECU.

The detected vibration waveform is compared with a knock waveform model stored in memory 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
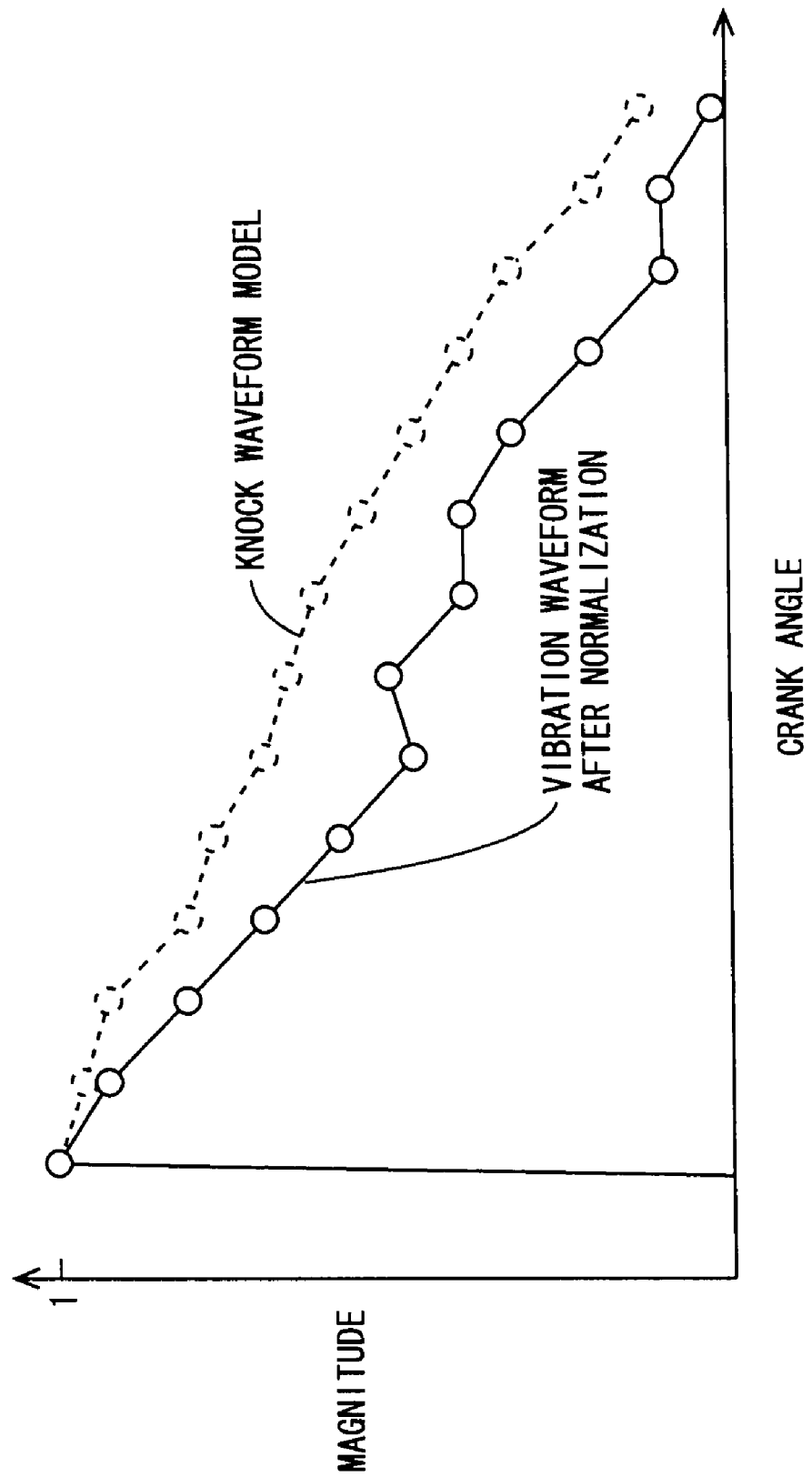
FIG. 6 is a chart for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If the maximum integrated value is P and a value representing the magnitude of vibration of engine 100 where knocking does not occur is BGL (Back Ground Level), knock magnitude N is calculated by an equation, N=P/BGL. BGL is stored in memory 202. A method of calculating knock magnitude N is not limited to it.

In the embodiment, engine ECU 200 compares calculated knock magnitude N and a determination value V(KX) stored in memory 202 with each other, and further compares the detected waveform and the stored knock waveform model with each other. Then engine ECU 200 determines whether or not knocking has occurred in engine 100 for every ignition cycle.

As shown in FIG. 7, determination values V(KX) are stored as a map using an engine speed NE and an intake air amount KL as parameters.

As an initial value of determination value V(KX), a value determined in advance by an experiment or the like is used. However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation 6 of magnitude values LOG(V) equal to or smaller than median value V(50) is calculated. For example, in the embodiment, a median value V(50) and a standard deviation (a, which approximate the median value and standard deviation calculated based on a plurality of magnitude values LOG (V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation a from the previously calculated median value V(50), then a value obtained by subtracting a value twice as large as a predetermined value C(3) from the previously calculated standard deviation $\sigma$ is calculated as a current standard deviation $\sigma$. On the other hand, if a currently detected magnitude value LOG(V) is greater than a previously calculated median value V(50) or smaller than a value obtained by subtracting a previously calculated standard deviation C from the previously calculated median value V(50), then a value obtained by adding a predetermined value C(4) (e.g., C(3) and C(4) are the same value) to the previously calculated standard deviation $\sigma$ is calculated as a current standard deviation $\sigma$. A method of calculating median value V(50) and standard deviation $\sigma$ is not limited to it. Also, initial values of median value V(50) and standard deviation $\sigma$ may be values set in advance or may be "0".

Figure 8:
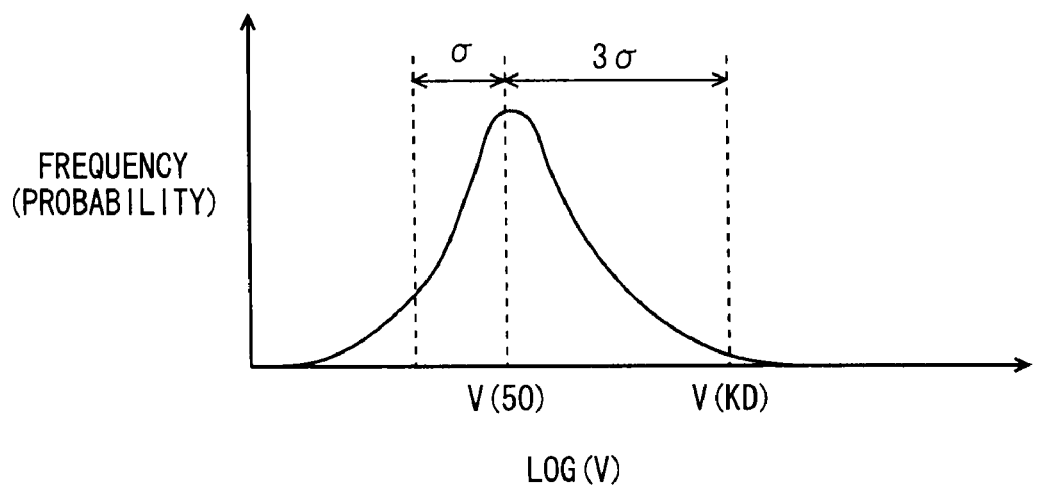
FIG. 8 is a chart (No. 1) showing frequency distribution of magnitude values LOG(V)

Using median value V(50) and standard deviation $\sigma$, a knock determination level V(KD) is calculated. As shown in FIG. 8, a value obtained by adding the product of a coefficient U(1) (U(1) is a constant and U(1)=3, for example) and standard deviation $\sigma$ to median value V(50) is a knock determination level V(KD). A method of calculating knock determination level V(KD) is not limited to it. The occurrence frequency of magnitude value LOG(V) greater than knock determination level V(KD) is determined as the occurrence frequency of knocking. Based on the knocking occurrence frequency, determination value V(KX) is corrected.

Coefficient U(1) is a coefficient obtained based on data and findings obtained by experiments and the like. Magnitude value LOG(V) greater than knock determination level V(KD) when U(1)=3 substantially agrees with magnitude value LOG (V) in an ignition cycle in which knocking has actually occurred. It is also possible to use other values than "3" as coefficient U(1).

Figure 9:
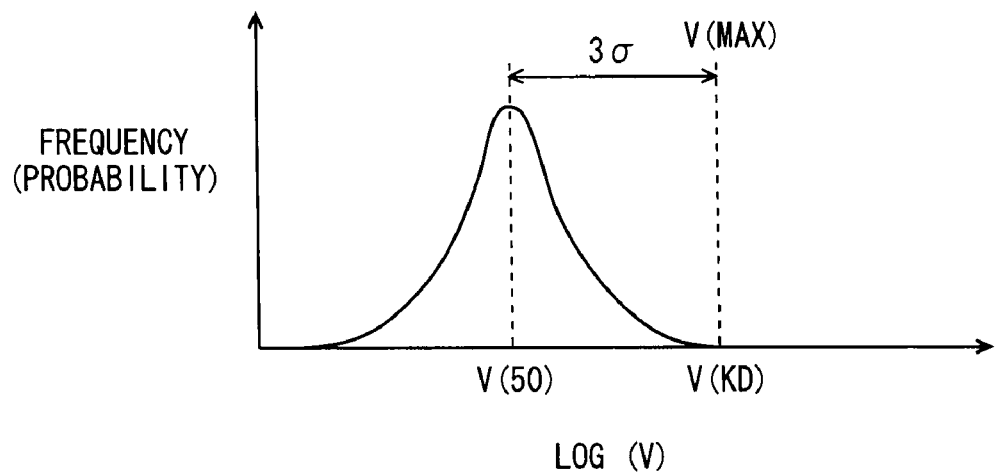
FIG. 9 is a chart (No. 2) showing frequency distribution of magnitude values LOG(V)
Figure 10:
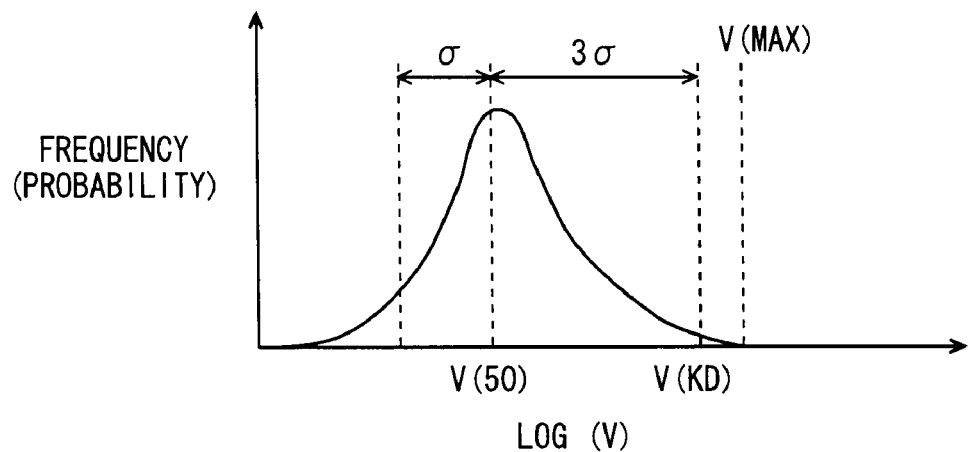
FIG. 10 is a chart (No. 3) showing frequency distribution of magnitude values LOG(V)

If knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, by the occurrence of knocking, a greater magnitude V is detected. When a great magnitude value LOG(V) is calculated, as shown in FIG. 10, maximum value V(MAX) becomes greater than knock determination level V(KD).

Figure 11:
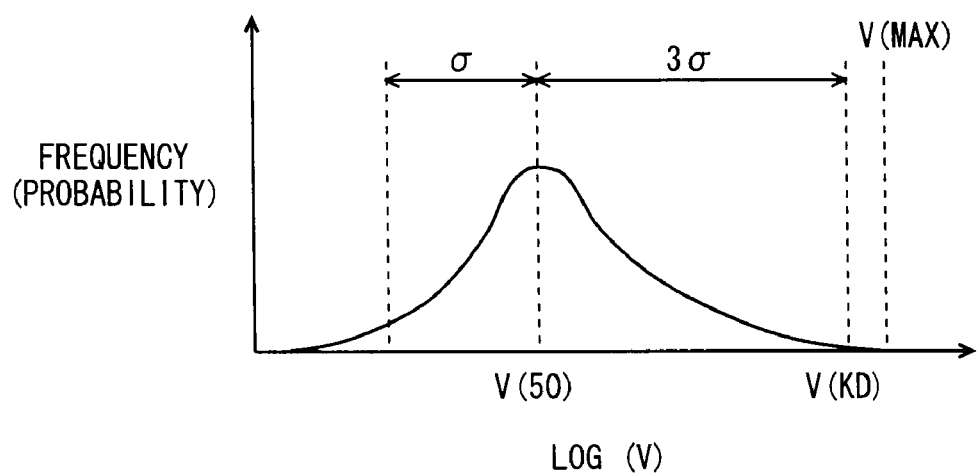
FIG. 11 is a chart (No. 4) showing frequency distribution of magnitude values LOG(V)

When the frequency of occurrence of knocking becomes further higher, as shown in FIG. 11, maximum value V(MAX) becomes further greater. Median value V(50) and standard deviation a in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Therefore, in the embodiment, magnitude values LOG(V) in a range surrounded with a broken line in FIG. 12 are used to exclude magnitude values LOG(V) greater than a threshold value V(1), to thereby obtain median value V(50) and standard deviation CT. FIG. 12 is a chart in which calculated magnitude values LOG(V) are plotted for each correlation coefficient K in a cycle in which the magnitude values LOG (V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation $\sigma$, median value V(50) and standard deviation $\sigma$ do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation $\sigma$ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
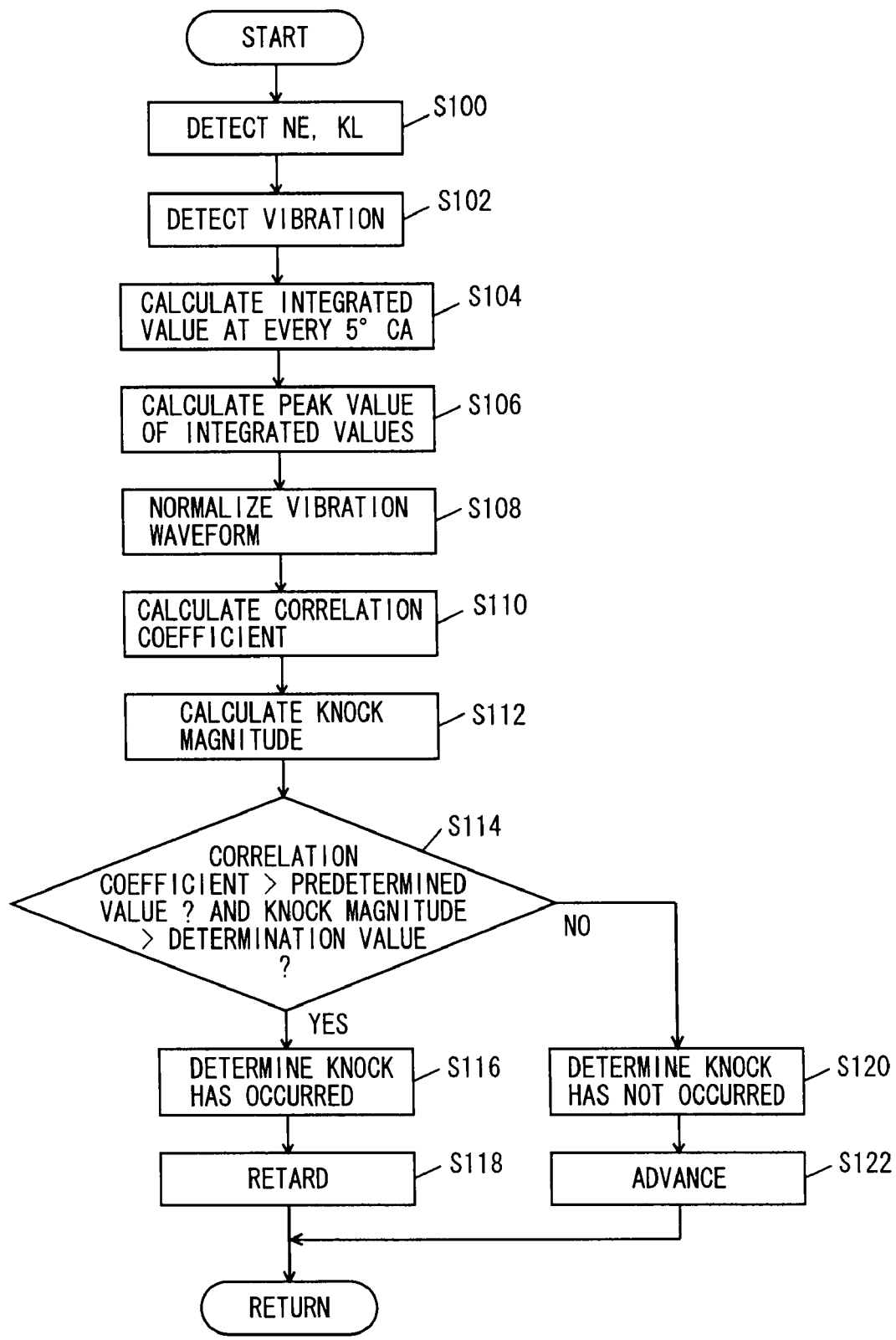
FIG. 13 is a flowchart (No. 1) showing a control structure of the program executed by the engine ECU in FIG. 1.

With reference to FIG. 13, a control structure of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other. In S12, engine ECU 200 calculates knock magnitude N.

In S114, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S114), the processing moves to S116. Otherwise (NO in S114), the processing moves to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 14:
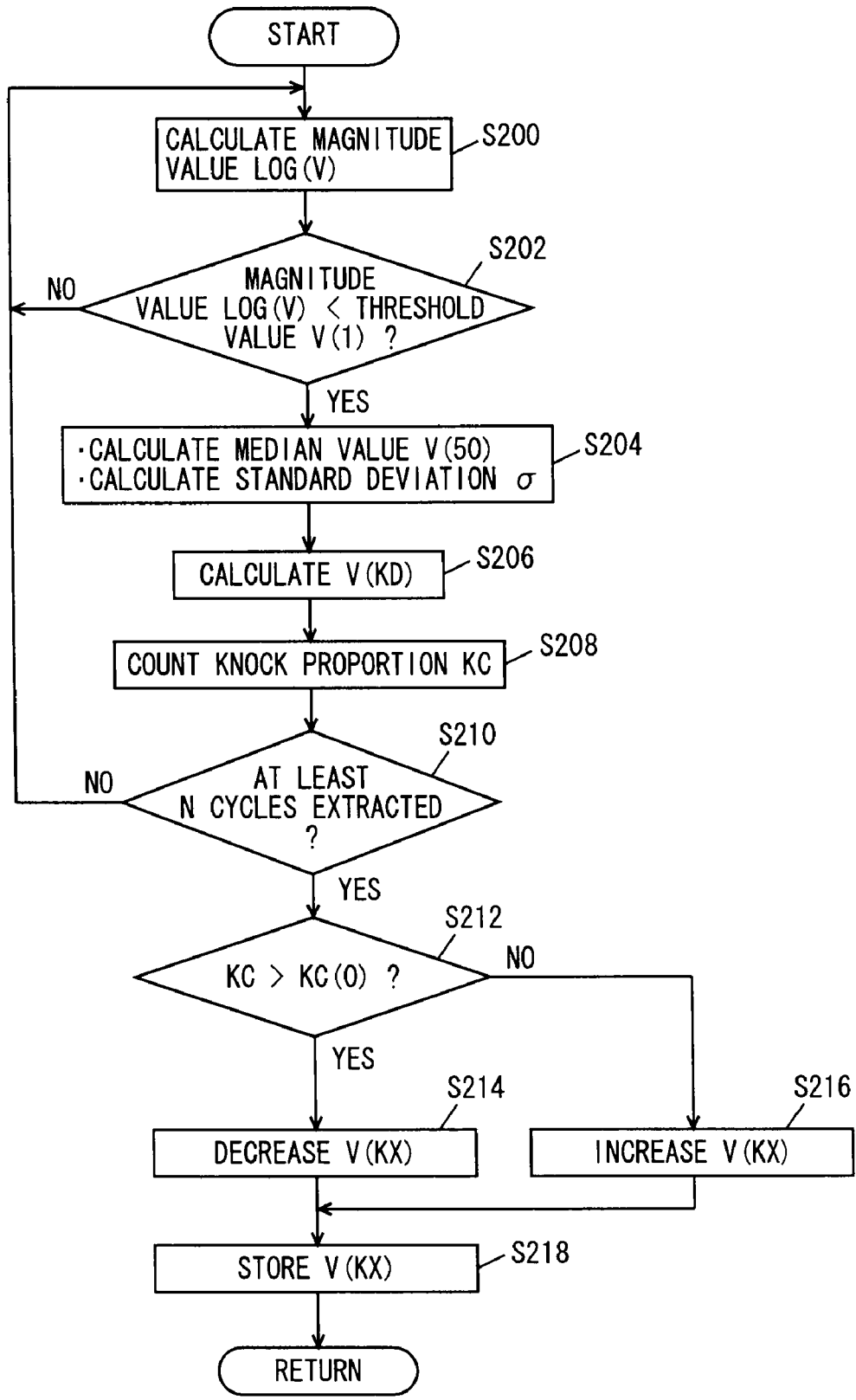
FIG. 14 is a flowchart (No. 2) showing the control structure of the program executed by the engine ECU in FIG. 1.

With reference to FIG. 14, a control structure of a program executed by engine ECU 200 which is the ignition timing control device according to the embodiment so as to correct determination value V(KX) will be described.

In S200, engine ECU 200 calculates magnitude value LOG (V) from magnitude V detected based on a signal sent from knock sensor 300. Magnitude V is a peak value (peak value of integrated values at every 5°) between predetermined crank angles.

In S202, engine ECU 200 determines whether magnitude value LOG(V) is smaller than the aforementioned threshold value V(1). When magnitude value LOG(V) is smaller than the aforementioned threshold value V(1) (YES in S202), the processing moves to S204. Otherwise (NO in S202), the processing goes back to S200.

In S204, engine ECU 200 calculates median value V(50) and standard deviation σ of the extracted magnitude values LOG(V). The calculation of median value V(50) and standard deviation σ may be performed every time magnitude values LOG(V) for N cycles (where N is a natural number, e.g., N=200) are extracted.

In S206, engine ECU 200 calculates knock determination level V(KD) based on median value V(50) and standard deviation σ.

In S208, engine ECU 200 counts the proportion of magnitude values LOG(V) greater than knock determination level V(KD) to the extracted magnitude values LOG(V) as a knock proportion KC.

In S210, engine ECU 200 determines whether or not magnitude values LOG(V) for N cycles are extracted. When magnitude values LOG(V) for N cycles are extracted (YES in S210), the processing moves to S212. Otherwise (NO in S210), the processing goes back to S200.

In S212, engine ECU 200 determines whether or not knock proportion KC is greater than a threshold value KC(0). If knock proportion KC is greater than threshold value KC(0) (YES in S212), the processing moves to S214. Otherwise (NO in S212) the processing moves to S216.

In S214, engine ECU 200 decreases determination value V(KX) stored in memory 202 by a correction amount stored in memory 202. In S216, engine ECU 200 increases determination value V(KX) stored in memory 202 by a correction amount stored in memory 202. In S218, engine ECU 200 stores determination value V(KX) in memory 202.

Figure 15:
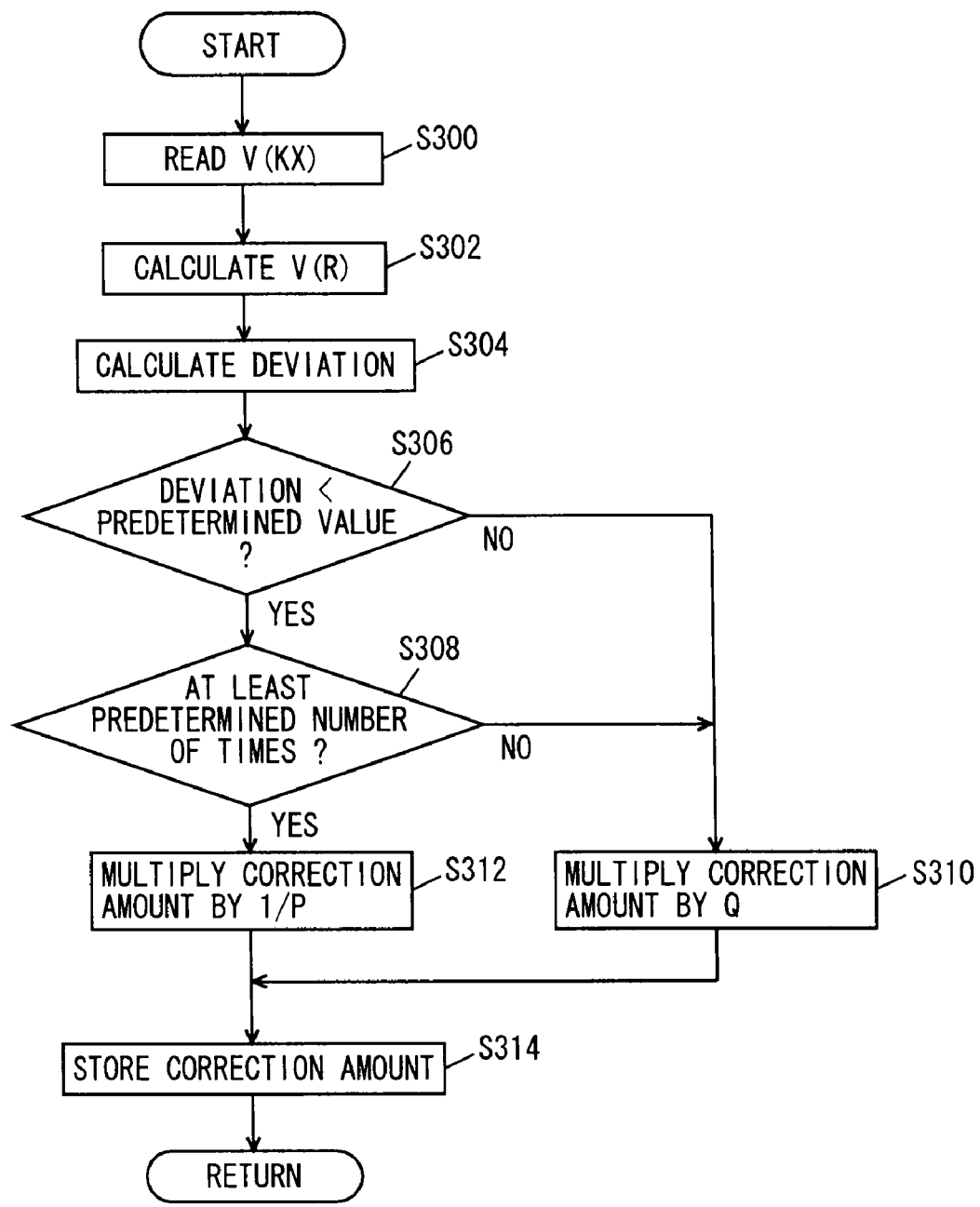
FIG. 15 is a flowchart (No. 3) showing the control structure of the program executed by the engine ECU in FIG. 1.
Figure 16:
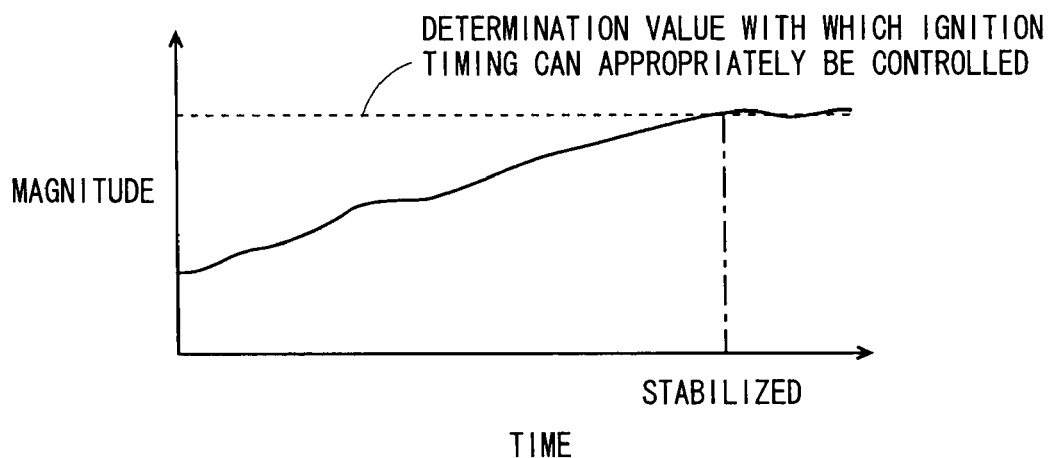
FIG. 16 is a timing chart (No. 1) of determination value V(KX)

With reference to FIG. 15, a control structure of a program executed by engine ECU 200 which is the ignition timing control device according to the embodiment so as to set a correction amount of determination value V(KX) will be described. It is to be noted that the program described in the following is executed every time determination value V(KX) is corrected.

In S300, engine ECU 200 reads determination value V(KX) stored in memory 202.

In S302, engine ECU 200 calculates approximation value V(R) (where R is a natural number), which is an approximation of an average value of past M (M is a natural number, e.g., M=16) determination values V(KX). If an approximation value calculated when setting the previous correction amount is V(R−1), then it is calculated by an equation, V(R)={(M−1)×V(R−1)+V(KX)}/M. Approximation value V(R) is a value obtained by approximating the previously calculated approximation value V(R−1) to the average value of past (M−1) determination values V(KX), adding the current determination value V(KX) thereto and averaging the same. Therefore, it is an approximation of the average value of past M determination values V(KX). It is to be noted that the method of calculating approximation value V(R) is not limited thereto. Also, not approximation value V(R) but an average value of past M determination values (KX) may be calculated.

In S304, engine ECU 200 calculates a deviation L of approximation value V(R) and approximation value V(R−1) from each other. An absolute value obtained by subtracting approximation value V(R−1) from approximation value V(R) is calculated as deviation L. It is to be noted that the method of calculating deviation L is not limited thereto.

In S306, engine ECU 200 determines whether or not deviation L is smaller than a predetermined value. When deviation L is smaller than a predetermined value (YES in S306), the processing moves to S308. Otherwise (NO in S306), the processing moves to S310.

In S308, engine ECU 200 determines whether or not the number of times where deviation L is determined to be smaller than the predetermined value is greater than a predetermined number of times. When it is greater than the predetermined number of times (YES in S308), the processing goes to S312. Otherwise (NO in S308), the processing goes to S310.

In S310, engine ECU 200 sets a value obtained by multiplying a reference correction amount (a correction amount initial value) by Q (Q is an integer not smaller than 1) as the correction amount of determination value V(KX). It is to be noted that the method of setting the correction amount of determination value V(KX) is not limited thereto. For example, a value obtained by multiplying a previously set correction amount by Q may be set as the current correction amount of determination value V(KX). Also, "Q" may be a variable. For example, greater "Q" may be set as deviation L is greater.

In S312, engine ECU 200 sets a value obtained by multiplying the reference correction amount by 1/P (P is an integer not smaller than 1) as a correction amount of determination value V(KX). It is to be noted that "P" may be a constant or a variable. For example, employing a constant of P=1 (multiplied by 1/P=multiplied by 1), the reference correction amount may be set as the correction amount of determination value V(KX). Also, as deviation L is smaller, greater "P" may be set so that "1/P" becomes smaller. In S314, engine ECU 200 stores the set correction amount in memory 202.

Operation of engine ECU 200 which is the ignition timing control device according to the embodiment based on the above configuration and flowcharts will be described.

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value $\Delta S(I)$ of the deviation of the vibration waveform after the normalization and the knock waveform model from each other at each crank angle is calculated. Based on the total of $\Delta S(I)$, i.e., $\Sigma \Delta S(I)$ and value S obtained by integrating the magnitude of the vibration in the knock waveform model by the crank angle, correlation coefficient K is calculated by $K=(S-\Sigma \Delta S(I))/S$ (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Furthermore, knock magnitude N is calculated by dividing peak value P by BGL (S112). Thus, it becomes possible to analyze in more detail whether or not vibration of engine 100 is due to knocking.

If correlation coefficient K is greater than a predetermined value and knock magnitude N is greater than a predetermined determination value V(KX) (YES in S114), it is determined that knocking has occurred (S116) and the ignition timing is retarded (S118). As a result, occurrence of the knocking is suppressed. If correlation coefficient K is not greater than a predetermined value or knock magnitude N is not greater than a predetermined determination value (NO in S114), it is determined that knocking has not occurred (S120) and the ignition timing is advanced (S122). Thus, by comparing knock magnitude N and determination value V(KX) with each other, whether or not knocking has occurred is determined for each ignition cycle, and the ignition timing is retarded or advanced.

Meanwhile, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in engine ECU 200 that is the ignition timing control device of the present embodiment, magnitude value LOG(V) is calculated (S200). When calculated magnitude value LOG(V) is smaller than the aforementioned threshold value V(1) (YES in S202), median value V(50) and standard deviation $\sigma$ are calculated (S204). Knock determination level V(KD) is calculated based on such median value V(50) and standard deviation $\sigma$ (S206). As a result, knock determination level V(KD) can be suppressed from becoming excessively high. The proportion of magnitude values LOG(V) greater than knock determination level V(KD) is counted as a knock proportion KC (S208). When magnitude values LOG(V) for N cycles are extracted (YES in S210) and knock proportion KC is greater than threshold value KC(0) (YES in S212), determination value V(KX) is decreased so that retard control of ignition timing (S118) is frequently performed (S214). When knock proportion KC is smaller than threshold value KC(0) (NO in S212), determination value V(KX) is increased so that advance control of ignition timing (S122) is frequently performed (S216). As a result, it becomes possible to appropriately correct the determination value in the knocking determination for each ignition cycle, to thereby appropriately control ignition timing. Determination value V(KX) is stored in memory 202 (S218).

There may be a case where an initial value of determination value V(KX), e.g., in starting of the internal combustion engine, greatly differs from the above-described determination value with which the ignition timing can appropriately be controlled. In such a case, if the correction amount of determination value V(KX) is small and constant, it takes time to correct and stabilize determination value V(KX) at a determination value with which igniting timing can appropriately be controlled. In such a case, it is necessary to increase the correction amount of determination value V(KX) to stabilize at an early stage determination value V(KX) at a determination value with which ignition timing can appropriately be controlled. Accordingly, it is necessary to determine whether or not a difference between current determination value V(KX) and the determination value with which ignition timing can appropriately be controlled is great.

Then, determination value V(KX) stored in memory 202 is read (S300), and approximation value V(R) of past M determination values V(KX) is calculated (S302). Deviation L of approximation value V(R) and approximation value V(R−1) from each other is calculated (S304). When the initial value of determination value V(KX) is small and deviation L is great, it is considered to be a state where knock proportion KC is frequently determined to be smaller than threshold value KC(0) (NO in S212), i.e., a state where occurrence frequency of knocking is low. This case can be regarded to be a state where retarding of ignition timing is more frequently performed, that is, a state where determination value V(KX) is so small that even with a small knock magnitude it is determined that knocking has occurred by the knocking determination performed for each ignition cycle. Accordingly, this can be regarded to be a state where the difference between the current determination value V(KX) and the determination value with which ignition timing can appropriately be controlled is great.

On the other hand, when the initial value of determination value V(KX) is great and deviation L is great, it is considered to be a state where knock proportion KC is frequently determined to be greater than threshold value KC(0) (YES in S212), i.e., a state where occurrence frequency of knocking is high. This case can be regarded to be a state where advancing of ignition timing is more frequently performed, that is, a state where determination value V(KX) is so great that even with a great knock magnitude it is determined that knocking has not occurred by the knocking determination performed for each ignition cycle. Accordingly, this can be regarded to be a state where the difference between the current determination value V(KX) and the determination value with which ignition timing can appropriately be controlled is great.

Figure 17:
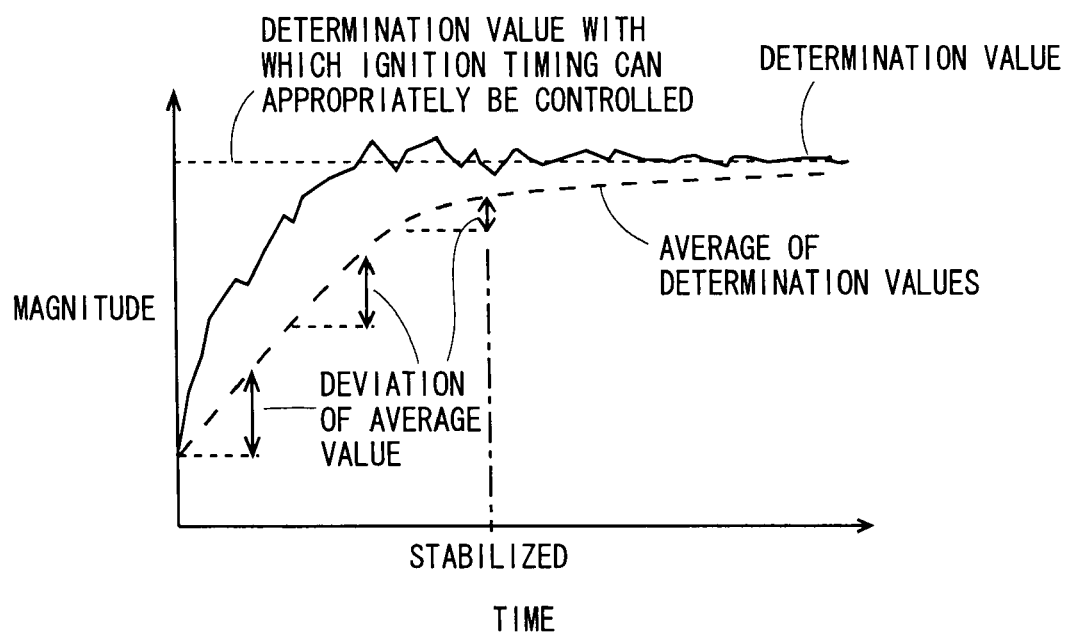
FIG. 17 is a timing chart (No. 2) of determination value V(KX)

Accordingly, when deviation L is greater than a predetermined value (NO in S306), a value obtained by multiplying a reference correction amount by Q is set as a correction amount of determination value V(KX) (S310). As a result, as shown in FIG. 17, determination value V(KX) can be brought into a state, at an early stage, where ignition timing can appropriately be controlled.

On the other hand, when deviation L is small, it is regarded to be a state where the difference between the frequency by which knock proportion (KC) is determined to be greater than threshold value KC(0) (YES in S212) and the frequency by which it is determined be smaller (NO in S212) is small, i.e., a state where knocking occurrence frequency is appropriate. In the state where knocking occurrence frequency is appropriate, in knocking determination performed for each ignition cycle, the frequency of determining that knocking has occurred (S116) and the frequency of determining that knocking has not occurred (S120) become substantially the same, and retarding (S118) and advancing (S122) of ignition timing are performed by substantially the same frequency. Such a case can be regarded to be a state where the difference between current determination value V(KX) and the determination value with which ignition timing can appropriately be controlled is small.

However, even in a state where the difference between current determination value V(KX) and the determination value with which ignition timing can appropriately be controlled is great, there may be a case where deviation L is accidentally smaller than a predetermined value. In such a case, unless the correction amount of determination value V(KX) is set to be great, it takes time for current determination value V(KX) to become the determination value with which ignition timing can appropriately be controlled.

Accordingly, even when deviation L is smaller than a predetermined value (YES in S306), if the number of times where deviation L is determined to be smaller than the predetermined value is smaller than a predetermined number of times (NO in S308), a value obtained by multiplying the reference correction amount by Q is set as the correction amount of determination value V(KX) (S310). As a result, when there is a possibility that the difference between current determination value (KX) and the determination value with which ignition timing can appropriately be controlled is great, the correction amount of determination value V(KX) can be increased. As a result, the state where ignition timing can appropriately be controlled is attained at an earlier stage.

When deviation L is smaller than a predetermined value (YES in S306) and the number of times where deviation L is determined to be smaller than the predetermined value is greater than a predetermined number of times (YES in S308), a value obtained by multiplying the reference correction amount by 1/P is set as the current correction amount of determination value V(KX) (S312). For example, with "1/P=1", the reference correction amount is set as the correction amount of determination value V(KX). As a result, current determination value V(KX) is more precisely rendered to be the determination value with which ignition timing can appropriately be controlled. Thus, the state where ignition timing can appropriately be controlled can be maintained. Based on a result of comparison between such determination value V(KX) and knock determination value N, ignition timing is controlled. As a result, ignition timing can appropriately be retarded or advanced.

As above, according to the engine ECU that is the ignition timing control device of the embodiment, when deviation L of the average of determination values V(KX) is greater than a predetermined value, it is determined that the difference between current determination value V(KX) and the determination value with which ignition timing can appropriately be controlled is great, and the correction amount of determination value V(KX) is increased. As a result, at an earlier stage, determination value V(KX) can be converged to the determination value with which ignition timing can appropriately be controlled. When deviation L is smaller than a predetermined value, it is determined that the difference between current determination value V(KX) and the determination value with which ignition timing can appropriately be controlled is small, and the correction amount of determination value V(KX) is changed to be small. Thus, the state where ignition timing can appropriately be controlled can be maintained.

Figure 18:
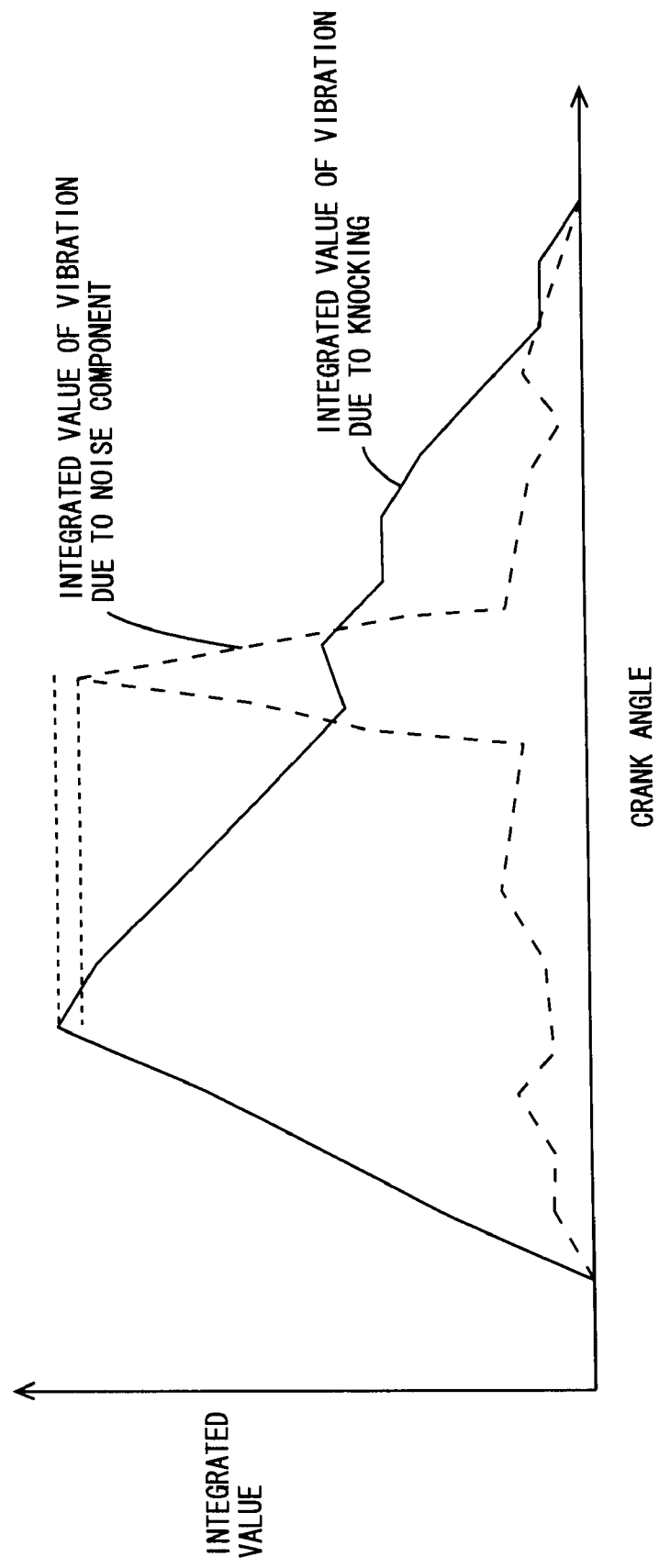
FIG. 18 is a chart (No. 1) showing an integrated value at the time of knocking and an integrated value by noise.

As shown in FIG. 18, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 19, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the sum of the integrated values in the vibration waveform by BGL.

As shown in FIG. 19, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A device for controlling ignition timing of an internal combustion engine, comprising
an operation unit, wherein
said operation unit calculates knock magnitude related to magnitude of vibration due to knocking, based on magnitude of vibration occurring in said internal combustion engine, said operation unit controls ignition timing of said internal combustion engine, based on a result of comparison between said knock magnitude and a predetermined determination value, said operation unit corrects said determination value, based on an occurrence frequency of said knocking, said operation unit sets a correction amount of said determination value to a value corresponding to a degree of change of the determination value as a result of the determination value being corrected a plurality of times, the degree of change of said determination value being calculated as a difference between a first determination value and a second determination value, the second determination value being temporally different from the first determination value, said operation unit calculates, at a first timing, a first value based on an average of a number of determination values calculated immediately prior to the first timing, said operation unit calculates, at a second timing later than said first timing, a second value based on an average of the number of determination values calculated immediately prior to the second timing, and the degree of change of said determination value is calculated as a difference between said first value and said second value.

2. The device for controlling ignition timing of the internal combustion engine according to claim 1, wherein when the degree of change of said determination value is great, said operation unit sets said correction amount to be greater than when the degree of change of said determination value is small.

3. The device for controlling ignition timing of the internal combustion engine according to claim 2, wherein when the degree of change of said determination value is greater than a predetermined degree, said operation unit sets said correction amount to be greater than when the degree of change of said determination value is smaller than the predetermined degree.

4. The device for controlling ignition timing of the internal combustion engine according to claim 2, wherein when the degree of change of said determination value is smaller than a predetermined degree, said operation unit sets said correction amount to be smaller than when the degree of change of said determination value is greater than the predetermined degree.

5. The device for controlling ignition timing of the internal combustion engine according to claim 1, wherein said operation unit determines whether or not the degree of change of said determination value is smaller than a predetermined degree, and when a number of times where the degree of change of said determination value is determined to be smaller than the predetermined degree is smaller than a predetermined number of times, said operation unit sets said correction amount to be greater than when the number of times is greater than the predetermined number of times.

6. The device for controlling ignition timing of the internal combustion engine according to claim 5, wherein when the number of times where the degree of change of said determination value is determined to be smaller than the predetermined degree is greater than the predetermined number of times, said operation unit sets said correction amount to be smaller than when the number of times is smaller than the predetermined number of times.

7. The device for controlling ignition timing of the internal combustion engine according to claim 1, wherein when said occurrence frequency of said knocking is low, said operation unit corrects said determination value to be greater than when said occurrence frequency of said knocking is high.

8. A device for controlling ignition timing of an internal combustion engine, comprising:

knock magnitude calculating means for calculating knock magnitude related to magnitude of vibration due to knocking, based on magnitude of vibration occurring in said internal combustion engine;

control means for controlling ignition timing of said internal combustion engine, based on a result of comparison between said knock magnitude and a predetermined determination value;

correcting means for correcting said determination value, based on an occurrence frequency of said knocking;

setting means for setting a correction amount of said determination value to a value corresponding to a degree of change of the determination value as a result of the determination value being corrected a plurality of times, the degree of change of said determination value being calculated as a difference between a first determination value and a second determination value, the second determination value being temporally different from the first determination value;

means for calculating, at a first timing, a first value based on an average of a number of determination values calculated immediately prior to the first timing; and means for calculating, at a second timing later than said first timing, a second value based on an average of the number of determination values calculated immediately prior to the second timing, wherein the degree of change of said determination value is calculated as a difference between said first value and said second value.

9. The device for controlling ignition timing of the internal combustion engine according to claim 8, wherein said setting means includes means for setting, when the degree of change of said determination value is great, said correction amount to be greater than when the degree of change of said determination value is small.

10. The device for controlling ignition timing of the internal combustion engine according to claim 9, wherein said setting means includes means for setting, when the degree of change of said determination value is greater than a predetermined degree, said correction amount to be greater than when the degree of change of said determination value is smaller than the predetermined degree.

11. The device for controlling ignition timing of the internal combustion engine according to claim 9, wherein said setting means includes means for setting, when the degree of change of said determination value is smaller than a predetermined degree, said correction amount to be smaller than when the degree of change of said determination value is greater than the predetermined degree.

12. The device for controlling ignition timing of the internal combustion engine according to claim 8, further comprising means for determining whether or not the degree of change of said determination value is smaller than a predetermined degree, wherein said setting means includes means for setting, when a number of times where the degree of change of said determination value is determined to be smaller than the predetermined degree is smaller than a predetermined number of times, said correction amount to be greater than when the number of times is greater than the predetermined number of times.

13. The device for controlling ignition timing of the internal combustion engine according to claim 12, wherein said setting means includes means for setting, when the number of times where the degree of change of said determination value is determined to be smaller than the predetermined degree is greater than the predetermined number of times, said correction amount to be smaller than when the number of times is smaller than the predetermined number of times.

14. The device for controlling ignition timing of the internal combustion engine according to claim 8, wherein
said correction means includes means for correcting, when said occurrence frequency of said knocking is low, said determination value to be greater than when said occurrence frequency of said knocking is high.

15. A method of controlling ignition timing of an internal combustion engine, comprising:
calculating knock magnitude related to magnitude of vibration due to knocking, based on magnitude of vibration occurring in said internal combustion engine;
controlling ignition timing of said internal combustion engine, based on a result of comparison between said knock magnitude and a predetermined determination value;
correcting said determination value, based on an occurrence frequency of said knocking;
setting a correction amount of said determination value to a value corresponding to a degree of change of the determination value as a result of the determination value being corrected a plurality of times, the degree of change of said determination value being calculated as a difference between a first determination value and a second determination value, the second determination value being temporally different from the first determination value:
calculating, at a first timing, a first value based on an average of a number of determination values calculated immediately prior to the first timing; and
calculating, at a second timing later than said first timing, a second value based on an average of the number of determination values calculated immediately prior to the second timing,
wherein the degree of change of said determination value is calculated as a difference between said first value and said second value.

16. The method of controlling ignition timing of the internal combustion engine according to claim 15, wherein said setting the correction amount includes setting, when the degree of change of said determination value is great, said correction amount to be greater than when the degree of change of said determination value is small.

17. The method of controlling ignition timing of the internal combustion engine according to claim 16, wherein said setting the correction amount includes setting, when the degree of change of said determination value is greater than a predetermined degree, said correction amount to be greater than when the degree of change of said determination value is smaller than the predetermined degree.

18. The method of controlling ignition timing of the internal combustion engine according to claim 16, wherein said setting the correction amount includes setting, when the degree of change of said determination value is smaller than a predetermined degree, said correction amount to be smaller than when the degree of change of said determination value is greater than the predetermined degree.

19. The method of controlling ignition timing of the internal combustion engine according to claim 15, further comprising
determining whether or not the degree of change of said determination value is smaller than a predetermined degree,
wherein said setting the correction amount includes setting, when a number of times where the degree of change of said determination value is determined to be smaller than the predetermined degree is smaller than a predetermined number of times, said correction amount to be greater than when the number of times is greater than the predetermined number of times.

20. The method of controlling ignition timing of the internal combustion engine according to claim 19, wherein said setting the correction amount includes setting, when the number of times where the degree of change of said determination value is determined to be smaller than the predetermined degree is greater than the predetermined number of times, said correction amount to be smaller than when the number of times is smaller than the predetermined number of times.

21. The method of controlling ignition timing of the internal combustion engine according to claim 15, wherein said correcting said determination value includes correcting, when said occurrence frequency of said knocking is low, said determination value to be greater than when said occurrence frequency of said knocking is high.

* * * * *